March 31, 1936.  F. E. STAATS  2,035,514
HYDRAULIC CLUTCH
Filed Aug. 21, 1933  2 Sheets-Sheet 1
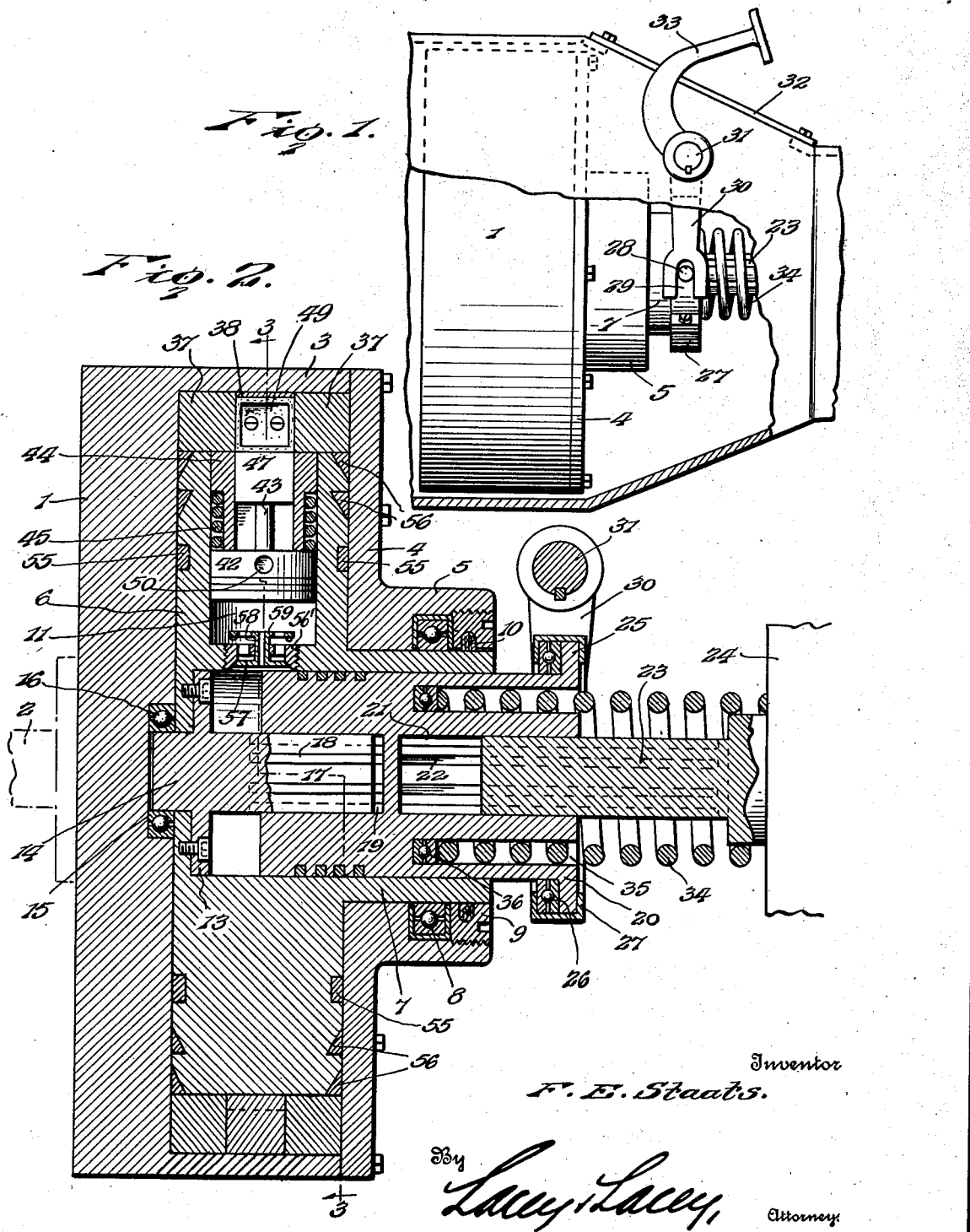
Inventor
F. E. Staats.
By Lacey & Lacey,
Attorney.

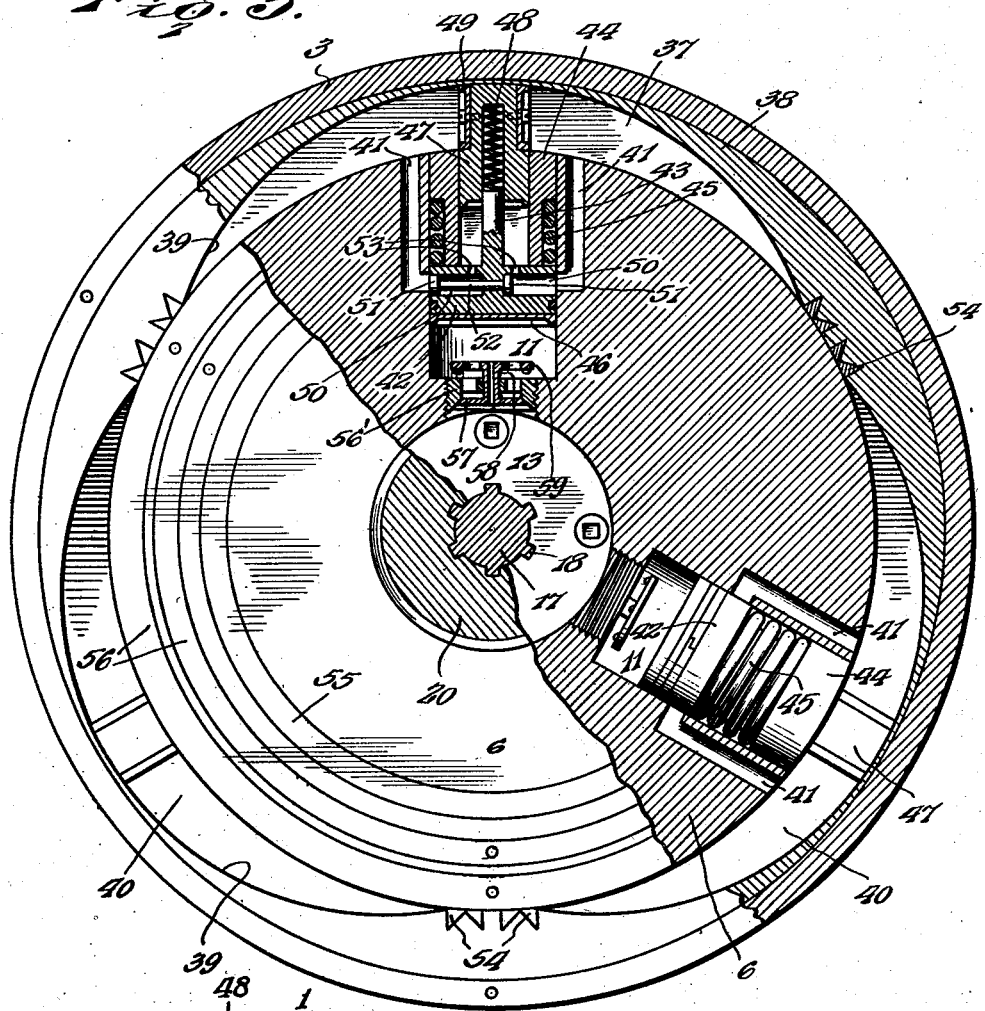
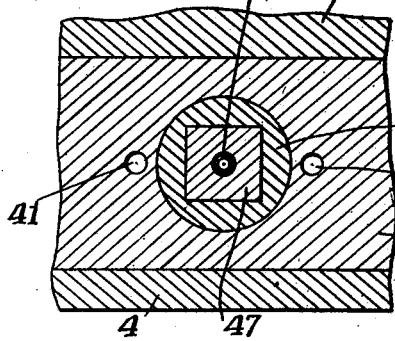

Patented Mar. 31, 1936

2,035,514

UNITED STATES PATENT OFFICE 2,035,514

HYDRAULIC CLUTCH

Franklin E. Staats, Peoria, Ill., assignor to Staats Hydraulic Appliance, Inc., Peoria, Ill., a corporation of Illinois Application August 21, 1933, Serial No. 686,158

3 Claims. (Cl. 192—58)

This invention relates to hydraulic clutches and is designed more particularly for use upon automobiles to couple the driving shaft of the engine with a driven shaft, but it is, of course, applicable to all cases where it is desirable to provide for ready release and closing of the clutch. The invention seeks to provide a clutch which will be easily operated and which will act without any gripping or grabbing action to connect the two members of the clutch together for transmitting motion. The invention is illustrated in the accompanying drawings and consists in certain novel features which will be hereinafter first fully described and then more particularly defined in the appended claims.

In the drawings, Figure 1 is an elevation, partly broken away and in section, of a clutch embodying the present invention, Fig. 2 is an enlarged longitudinal section, Fig. 3 is a transverse section on the line 3—3 of Fig. 2, Figure 4 is a detail section across the gripping plunger and the bushing in which it is mounted.

In the drawings, the reference numeral 1 indicates a flywheel which is secured in any convenient manner to an engine shaft, indicated at 2, and is constructed with an annular rim or flange 3. A clutch cover 4 is secured to the edge of the rim 3, as clearly shown in Fig. 2, and this cover is formed centrally with a hub 5. A clutch disk 6 is disposed within the flywheel and is held therein by the cover 4, as will be understood upon reference to Fig. 2, and said disk is formed centrally with a master cylinder 7 which extends outwardly in the hub 5 of the cover and is rotatable therein, anti-friction bearings 8 being provided between the hub and the cylinder to facilitate the relative rotation with minimum wear. The bearing 8 is held in place by a retaining nut 9 which carries a felt or other washer 10 in its inner periphery whereby to retain lubricant between the hub and the cylinder. The clutch disk 6 is also formed with a plurality of radial cylinders 11 which communicate at their inner ends with the interior of the master cylinder 7. Secured to the clutch disk, at the inner end of the master cylinder 7, is an annular flange or disk 13 on a journal 14 which projects through the center of the disk and is rotatably received in a recess 15 in the flywheel, anti-friction bearings 16 being disposed around the end of the journal between the same and the annular wall of the recess, as clearly shown. Alined with the journal 14 is a spline shaft 17 which is provided with longitudinal ribs or keys 18 and engages slidably in a socket 19 formed in the inner end of a master piston 20. Said piston 20 is slidably mounted within the master cylinder 7 and is provided on the wall of the socket 19 with longitudinal grooves which receive the keys or ribs 18 whereby the piston and the spline shaft may have relative endwise movement but will be constrained to rotate together, the clutch disk 6, of course, rotating with the shaft and the master piston. The master piston is constructed with a central socket 21 in its outer end which is provided with longitudinal grooves 22 corresponding in all respects to the grooves in the socket 19, as will be understood. A coupling shaft 23 leading into the transmission, indicated at 24, is fitted within the socket 21 and is provided with longitudinal ribs engaging the grooves 22 whereby the coupling shaft may slide endwise relative to the master piston but will be constrained to rotate therewith. At its outer or rear end, the piston 20 is provided with an annular flange 25 at the front side of which is mounted anti-friction bearings 26, and a ring or circular cap 27 is engaged around said flange and the bearings to maintain them in place and permit the piston to rotate relative to the cap. Disposed upon the outer side of the ring or cap 27, at diametrically opposite points thereof, are studs 28 which are engaged by the slotted ends 29 of a yoke 30, said yoke being carried by a rock shaft 31 which is rotatably mounted in any convenient manner below the floor boards 32 of the automobile. A clutch pedal 33 is secured to the rock shaft 31 and extends upwardly through a slot provided therefor in the floor boards in the usual manner. A coiled expansion spring 34 is disposed about the coupling shaft 23 and has one end bearing against the transmission case 24 and its opposite end received within an annular recess 35 formed in the outer end of the master piston 20, as clearly shown in Fig. 2, a thrust bearing 36 being disposed at the inner end of said recess 35 and the spring seating against said bearing.

Secured upon the inner circumference of the rim 3 of the flywheel are rings 37 and between said rings a raceway 38 is secured to the rim, said raceway having cam faces 39 which define cam chambers 40 between the rings 37, the raceway and the edge of the clutch disk, as shown most clearly in Fig. 3. Extending inwardly from the edge of the clutch disk, at the opposite sides of each cylinder 11, are passages 41 which form a by-pass for oil, as will presently appear. A clutching piston 42 is fitted in each cylinder 11 and each piston has a stem 43 projecting centrally from its outer side. A bushing 44 is fitted in the outer end of each cylinder 11 and may be secured in the end of the cylinder in any preferred manner, although a positive connection is not necessary inasmuch as the outer end of the bushing will be disposed under the rings 37, as clearly shown in Fig. 2. The inner end portion of each bushing 44 is reduced in its external diameter to provide a recess receiving an expansion spring 45 which bears upon the outer side of the respective piston 42 and tends normally to hold the piston at the inner end of the cylinder. The piston is provided with the usual piston rings to prevent leakage past the piston and may also be provided with a cup washer 46 on its inner side. Slidably mounted upon the stem 43 is a plunger 47 having a central socket to accommodate the stem and housing a spring 48 which serves as a buffer to cushion the instroke of the plunger. The bore of the bushing 44 is non-circular in cross section as shown in Figure 4 and the plunger 47 has a corresponding contour whereby rotation of the plunger in the bushing will be prevented but sliding movement will be permitted and upon each side of the plunger, at its outer end portion, is secured a cup washer 49 of leather or other suitable material to seal the bore of the bushing when the plunger is retracted.

The piston 42 is provided with alined radial recesses 50 at diametrically opposite points, said recesses opening through the outer side of the piston but being separated at their inner ends by a partition which forms an integral part of the piston, and in each passage is mounted a valve 51 consisting of a circular disk or head fitting slidably but closely within the respective passage, the valves being connected for simultaneous movement by a stem 52 which passes slidably through the central partition, as will be readily understood upon reference to Fig. 3. Each recess or valve chamber 50 communicates with the bore of the bushing 44 through an opening 53 in the inner side of the piston 42.

Packing 54 is provided at the high part of each cam 39 so that the leakage of oil between the respective chambers 40 and the edge of the clutch disk will be prevented and, for the same purpose, a sealing ring 55 is provided in each side of the clutch disk while packing 56 of triangular cross section is also seated in the sides of the clutch disk in correspondingly shaped annular recesses.

In the clutch disk, at the inner end of each cylinder 11, is secured a spider 56' which constitutes a valve seat and through which oil or other fluid may flow between the master cylinder and the radial cylinder 11. The inner end of the spider wall is beveled, as clearly shown in Figs. 2 and 3, and the lower valve disk 57 is adapted to seat firmly against said beveled surface. Said valve disk is imperforate, except for the lower end of the bore of a hollow stem 58 which rises from the disk and is slidably fitted through the central opening of the spider. A second disk 59 is carried by the upper end of the stem 58 and this disk 59 is provided with openings therethrough preferably arranged to register with the openings in the spider. When the master piston moves inwardly to apply the clutch, the pressure of the oil upon the disk 57 will seat the disk, and the oil can then escape only through the bore of the stem 58 so that the closing of the clutch will be accomplished gradually and smoothly. When the master piston is moved outwardly, the pressure of the oil in the cylinder 11 will be exerted downwardly through the openings in the spider to unseat the valve whereupon the oil may flow readily through all the openings in the spider to quickly release the clutch.

The construction and arrangement of the several parts of my improved clutch having been thus made known, it is thought the operation will be readily understood. When the parts are assembled, the chambers 40, the cylinders 11 and the master cylinder 7 are filled with oil or other non-compressible fluid, and it may be noted that any number of cylinders 11 may be provided although three are illustrated and will be ordinarily found sufficient, the capacity of the master cylinder 7 being equal to the combined capacities of all the cylinders 11. Normally the spring 34 holds the piston 20 in its forward or operative position and the oil is forced against the inner ends of the several pistons 42 so that they are moved outwardly and the plungers 47 are carried into gripping relation to the rim 3 of the flywheel. When the clutch pedal is depressed, the yoke 30 will be rocked rearwardly and the master piston 20 will be thereby drawn to the rear or outer end of the master cylinder, thereby reducing the pressure upon the inner ends of the several pistons 42 so that said pistons may move to the inner ends of their respective cylinders under the influence of the springs 45. When the pistons are thus moved to the inner ends of the respective cylinders, the outer ends of the pistons will be disposed at the inner sides of the by-pass passages 41 so that the oil in the several chambers 40 may flow across the pistons from one end of the respective oil chambers to the opposite ends thereof and, consequently, no clutching pressure will be exerted upon the several plungers 47 although said plungers will be yieldably held out against the cam surfaces 39 under the influence of the springs 48. The engine will thus be enabled to run idly, the flywheel riding over and past the ends of the several plungers without causing any clutching action. When the clutch pedal is released, the spring 34 at once expands and the oil which has filled the master cylinder 7 is forced out through the several valves 57 to act upon the inner ends of the several pistons 42, thereby moving said pistons outwardly to the position illustrated in the upper portion of Fig. 3. In this position the valve chambers in the piston are brought into alinement with the by-pass passages 41 and, assuming that the flywheel is rotating counter-clockwise in Fig. 3, the oil in the upper chamber 40 will be caused to act upon the valves and open the port 53 at the right of the figure while closing the port 53 at the left of the figure. Consequently, as the rotation of the flywheel continues, the oil will be caused to accumulate in the bore of the bushings 44 and thereby resist and prevent inward movement of the plungers. Consequently, the plungers will be caused to exert a gripping action upon the respective cam surfaces so that the clutch disk will be locked to the rim of the flywheel and will then rotate with the flywheel. The rotation of the disk will, of course, be transmitted through the spline shaft 17 to the master piston 20 and then through the coupling shaft 23 to the main shaft of the transmission. The clutching action will, of course, continue as long as the clutch pedal is not depressed and the spring 34 is permitted to remain in its expanded condition so that the oil will be held in the cylinders 11 and maintain the pistons in their outer positions. When the clutch pedal is again depressed, the spring 34 will, of course, be compressed and the master piston retracted, thereby relieving the pressure on the several pistons 42 so that the clutch will be again opened.

It will be readily seen that I have provided a very compact and easily operated clutch which will be flexible so that the closing of the clutch will be free of all sudden gripping or grabbing action which causes an irregular or jumping movement in the coupling parts and creates unnecessary wear upon the adjacent moving elements.

Having thus described the invention, I claim:

1. A clutch comprising a driving member, a clutch disk fitted to the driving member and having a plurality of radial cylinders therein, a master cylinder disposed axially upon the disk and communicating at its end with the inner ends of the radial cylinders, pistons mounted in the radial cylinders, yieldable means tending constantly to hold said pistons at the inner ends of said cylinders, means controlled by said pistons to effect clutching engagement with the driving member, a master piston in the master cylinder adapted to force fluid from the master cylinder into the radial cylinders, a journal on the disk rotatably mounted in the driving member and splined to the master piston whereby the piston may slide relative to said journal but will be constrained to rotate therewith, a socket in the outer end of the master piston, a coupling shaft splined in said socket to permit relative sliding movement of the piston but constrained to rotate therewith, yieldable means holding the master piston at the inner end of the master cylinder, and means for retracting the master piston.

2. A clutch comprising a driving member, a driven member including a clutch disk having radial working cylinders therein and provided with an axial master cylinder communicating with the several working cylinders, pistons in the working cylinders adapted to engage the driving member, a master piston in the master cylinder, yieldable means holding the master piston at the inner end of the master cylinder whereby fluid in said cylinder will be caused to act upon pistons in the working cylinders, means to withdraw the master piston, and means to restrict flow from the master cylinder to the working cylinders and accelerate flow in the opposite direction.

3. A clutch comprising a driving member, a driven member including a clutch disk having radial working cylinders therein and provided with an axial master cylinder communicating with the several working cylinders, pistons in the working cylinders adapted to engage the driving member, a master piston in the master cylinder, yieldable means holding the master piston at the inner end of the master cylinder whereby fluid in said cylinder will be caused to act upon pistons in the working cylinders, means to withdraw the master piston, and means to retard closing of the clutch and permit rapid opening thereof.

FRANKLIN E. STAATS.